United States Patent

[11] 3,629,635

[72] Inventors Edward M. Pauwels;
  Irving M. Ritsema; Ward C. Suttle, all of South Bend, Ind.
[21] Appl. No. 42,402
[22] Filed June 1, 1970
[45] Patented Dec. 21, 1971
[73] Assignee The Bendix Corporation

[54] WHEEL-SPEED SENSOR FOR AN ADAPTIVE BRAKING SYSTEM
7 Claims, 14 Drawing Figs.

[52] U.S. Cl. .................................................. 310/168, 310/154
[51] Int. Cl. ........................................................ H02k 17/42
[50] Field of Search .......................................... 310/79–82, 168–171, 112, 154, 114, 120, 121; 73/11–13; 324/174; 179/100.2 T; 295/36, 43; 105/61, 217, 118, 215 C; 108/55; 317/5; 303/20, 21

[56] References Cited
UNITED STATES PATENTS
| | | | |
|---|---|---|---|
| 3,447,838 | 6/1969 | Haviland | 74/13 |
| 1,797,579 | 3/1931 | Hoffman | 74/12 |
| 3,469,135 | 9/1969 | Haviland | 310/170 |
| 3,509,395 | 4/1970 | Schrecongost | 310/168 |
| RE.22,549 | 9/1944 | Plensler | 310/82 |
| 3,482,130 | 12/1969 | Woodward | 310/168 |

FOREIGN PATENTS
| | | | |
|---|---|---|---|
| 1,336,035 | 7/1963 | France | 310/168 |

Primary Examiner—D. X. Sliney
Assistant Examiner—R. Skudy
Attorneys—William N. Antonis and Plante, Hartz, Smith and Thompson ABSTRACT: A wheel-speed sensor utilizing a magnetic pickup and adapted for use on an automotive vehicle. A cup-shaped drive wheel has an elastomeric friction ring secured to the inside surface of the rim of the cup. The friction ring drives a driven wheel and tone wheel element of an assembly including a pickup whose components are assembled on a unitary plastic molding which also serves as the bobbin for the coil. The mounting element of the driven wheel and pickup is a unitary stamping attached to a nonrotatable portion of the vehicle.

INVENTORS
EDWARD M. PAUWELS,
IRVING R. RITSEMA
& WARD C. SUTTLE
BY
Plante, Hartz, Smith & Thompson
ATTORNEYS

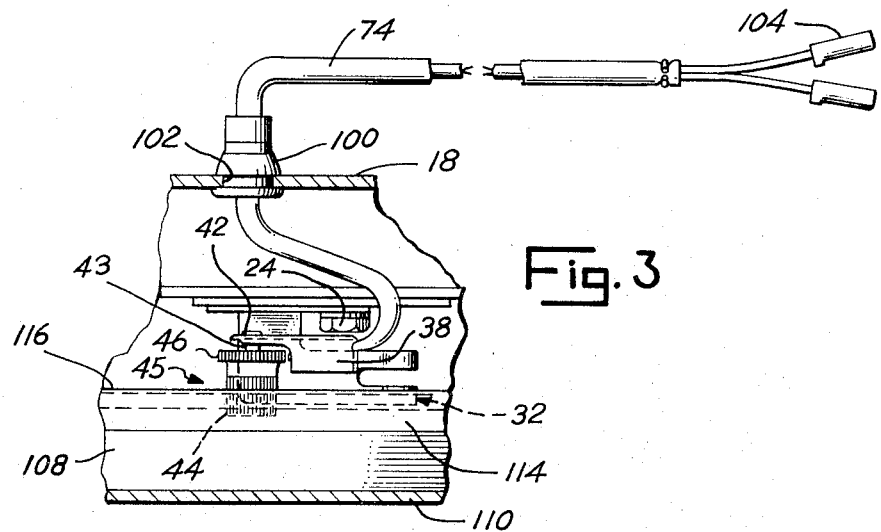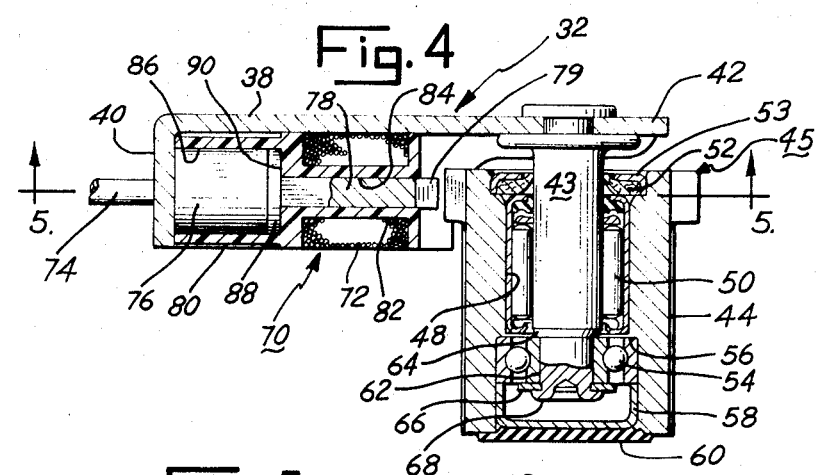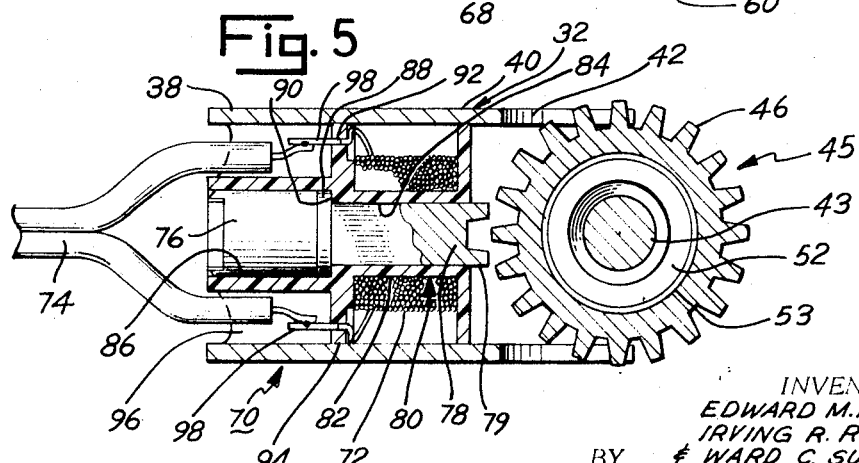

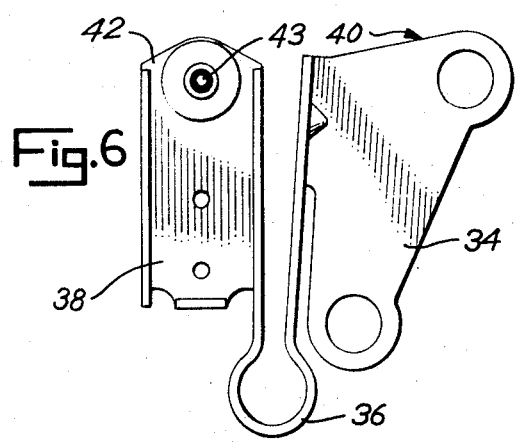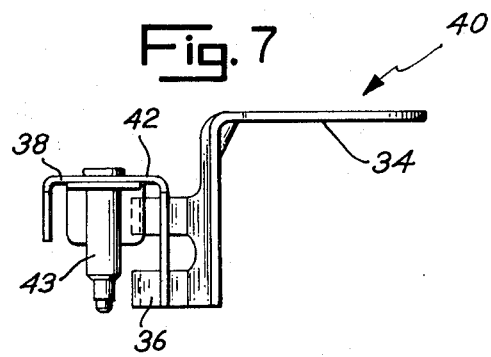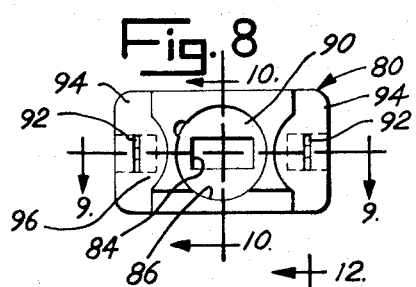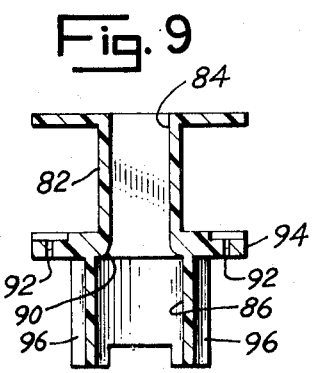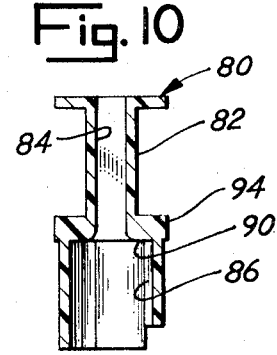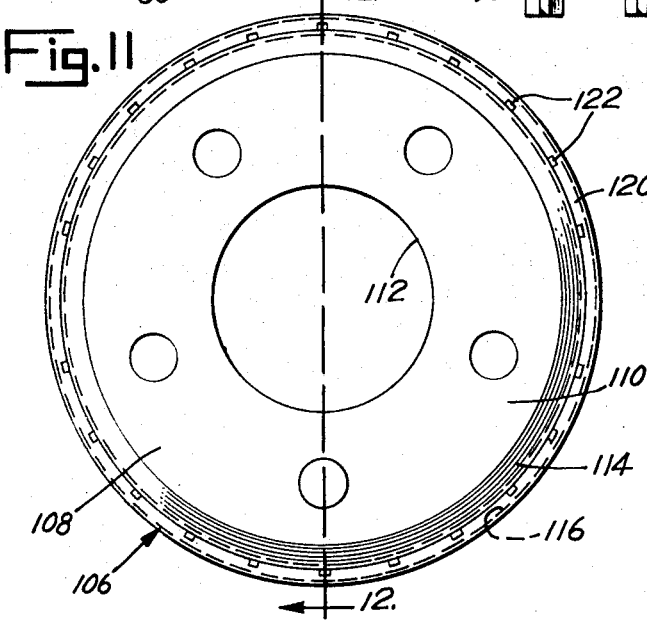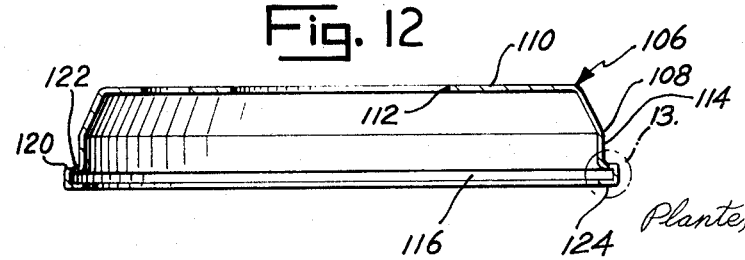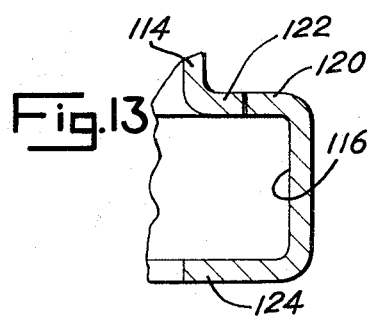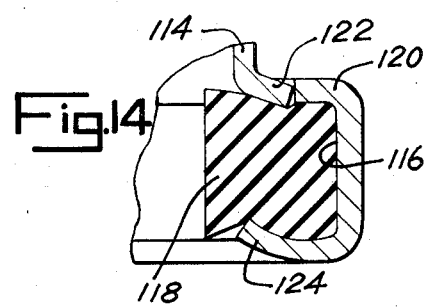

WHEEL-SPEED SENSOR FOR AN ADAPTIVE BRAKING SYSTEM

SUMMARY OF THE INVENTION

This invention relates to an adaptive braking system for use on an automobile. More specifically, it relates to the wheel-speed sensor which provides the adaptive braking system with information relative to the speed and acceleration of one of the several wheels of an automotive vehicle. An adaptive braking system of the type in which the invention would be used is described in U.S. Pat. No. 3,494,671. Wheel-speed sensors of the game general class and of which this is an improvement are described in U.S. Pat. application Ser. Nos. 42,112, filed June 1, 1970, and 42,111 filed June 1, 1970, having in common with this application the same assignee.

An object of the invention is to provide a wheel-speed sensor of the general type which can be readily and economically produced with conventional equipment by eliminating operations that are costly in labor such as cementing and post-assembly finishing. As a result, the invention discloses a drive wheel which can be substantially formed by a single stroke of a press.

Along the same lines the invention includes a pickup for the sensor in which a unitary plastic molding serves not only as the usual coil-winding bobbin, but also has provision for the permanent attachment of the coil terminals. In addition, the permanent magnet and the ferromagnetic pole piece are received and held in their relative positions prior to final assembly into the outer housing. In accordance with the invention, the outer housing of the pickup may be an integral portion of the structural elements which support and combine the other elements of the sensor, such as the tone wheel.

Also as a feature of the invention the structural elements which comprise a spring section and mounting bracket may all be combined into a single integral sheet steel stamping.

BRIEF DESCRIPTION OF THE DRAWINGS

FIG. 3 is a sectional view taken generally along the line 3—3 of FIG. 1.

FIG. 4 is an enlarged sectional view showing in detail the structure of the tone wheel, driven wheel, pickup assembly.

FIG. 5 is a sectional view taken on line 5—5 of FIG. 4.

FIG. 6 is a plane view of the subassembly showing the integral stamping that constitutes the structural elements including the spring and mounting bracket of the sensor and the shaft for the driven wheel, tone wheel element.

FIG. 7 is an elevational view of the subassembly of FIG. 6.

FIG. 8 is a view of the plastic molding of the pickup assembly.

FIG. 9 is a sectional view along line 9—9 of FIG. 8.

FIG. 10 is a sectional view along line 10—10 of FIG. 8.

FIG. 11 is an elevational view of the cup-shaped element of the drive wheel.

FIG. 12 is a sectional view taken on the line 12—12 of FIG. 11.

FIG. 13 is a partial enlarged section of the cup-shaped element in the same plane as FIG. 12.

FIG. 14 is a view similar to FIG. 13 but with the elastomeric friction ring in place.

DETAILED DESCRIPTION OF THE INVENTION

Figure 1:
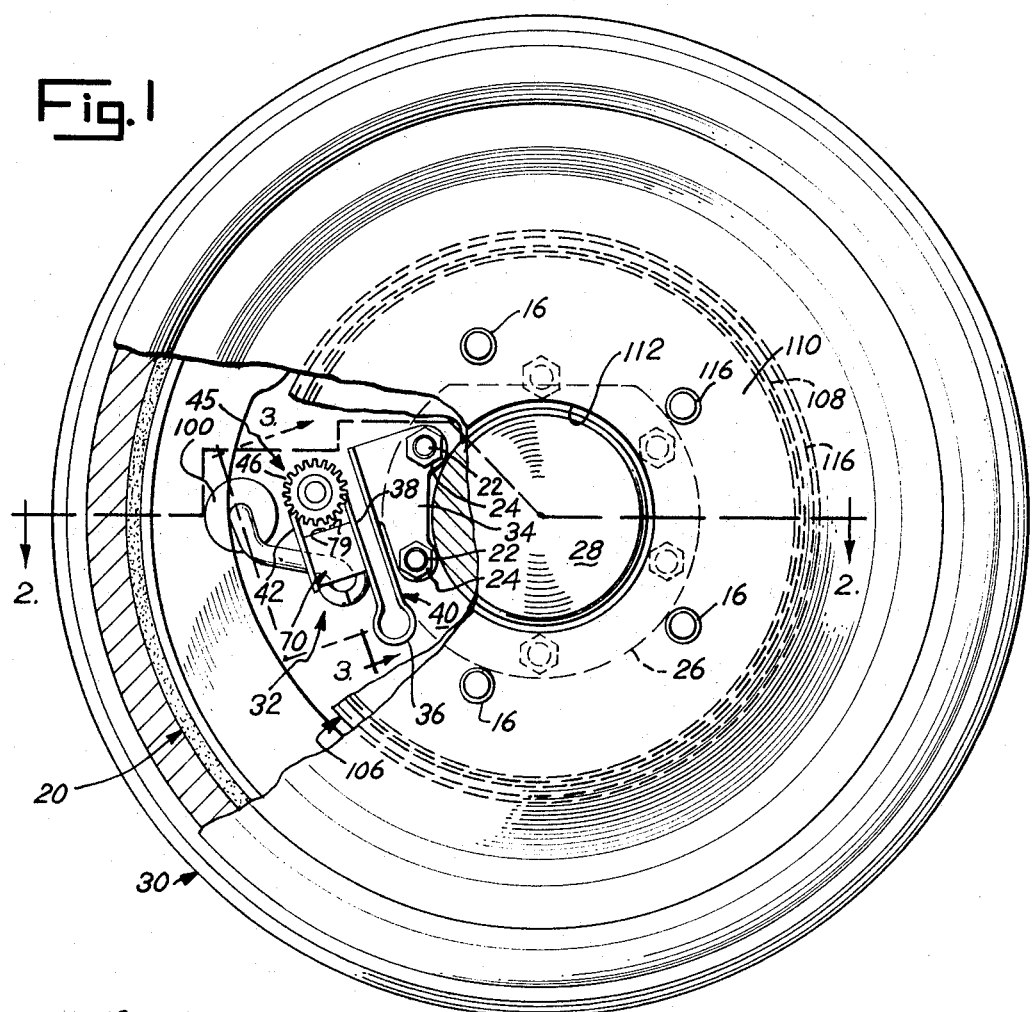
FIG. 1 is a view looking at the end of an automobile rear axle assembly with the wheel removed and with the brake drum, axle flange and friction drive wheel partly broken away to show the tone wheel, driven wheel, pickup assembly and their mounting.
Figure 2:
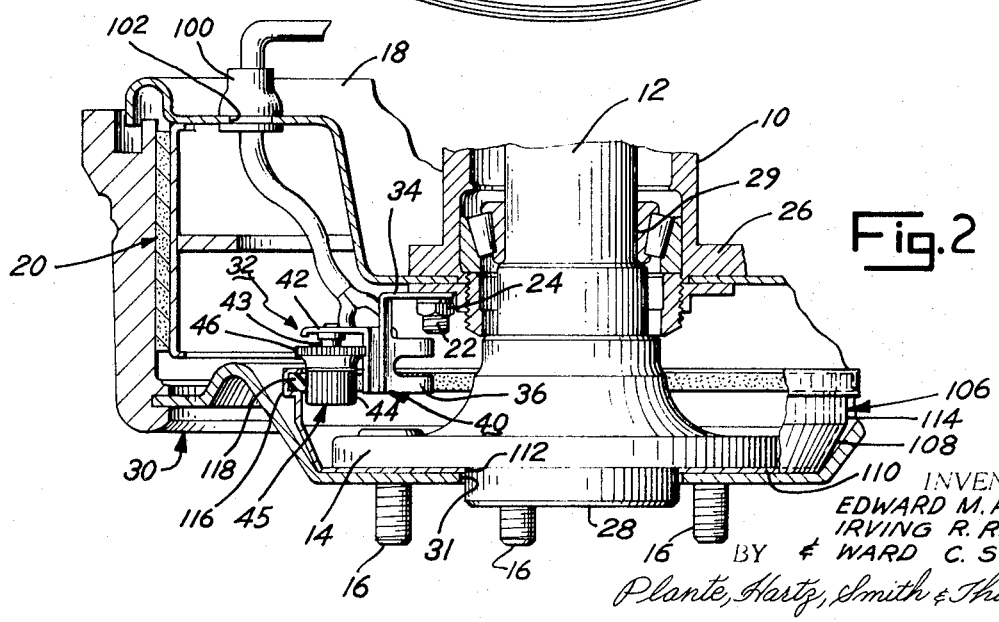
FIG. 2 is a sectional view taken generally along the line 2—2 of FIG. 1.

FIGS. 1 and 2 show a conventional rear axle housing 10 containing an axle 12 formed with a flange 14, into which are pressed the usual wheel mounting bolts 16. A brake backing plate 18, to which are attached the usual parts of a brake such as the shoes 20, is mounted by bolts 22 and nuts 24 to a flange 26 of the axle housing 10. The outer face of the axle flange 14 is formed with a pilot projection 28 which usually is made accurately concentric with the bearing surfaces 29 of the axle 12. The central bore 31 of a brake drum 30 pilots on the projection 28 and the drum 30 is held in place by being clamped between the wheel (not shown) and the axle flange 14.

In carrying out the invention, there is provided a driven wheel, tone wheel, pickup assembly indicated generally by the numeral 32. A bracket portion 34 is attached to the axle housing 10 by removing two of the nuts 24, placing the two mounting holes of the bracket 34 over the screws 22 and replacing the nuts 24. A C-shaped leaf spring element 36 and structural elements 38 for mounting the tone wheel, driven wheel 45 and pickup are illustrated as comprising integral parts of a single stamping 40 made from ferromagnetic material such as sheet steel. The structural elements 38 are formed generally in the shape of a box with one open side and one open end. The side of the box opposite the open side is extended lengthwise from the open end with a shallow U-section for strength to provide an arm 42 into which is riveted a shaft 43. The detailed structure of the stamping 40 can be clearly seen in FIGS. 6 and 7 which show the stamping 40 in subassembly with the shaft 43.

The driven wheel 45 is a generally cylindrical element 44 having a flange at one end formed with teeth resembling gear teeth to constitute the signal-generating elements of the tone wheel 46. As shown in FIGS. 4 and 5, the tone wheel, driven wheel 45 is an integral structure which may be machined from a bar of ferromagnetic material such as steel. Ferromagnetic material is required since the teeth or signal-generating elements must be of such material. The tone wheel, driven wheel 45 is formed with a through bore 48 in which is pressed a roller bearing 50 rotatably seated on the shaft 43. The bore 48 has enlarged portions at each end. The one at the top, as seen in FIG. 4, receives a pressed-in dirt excluding seal 52 and retainer 53 which also engages the shaft 43. The enlarged portion of the bore 48 at the bottom, as seen in FIG. 4, has pressed into it a ball bearing 54 which is seated against a shoulder 56 and held by a pressed-in cup-shaped stamping 58 which closes the open end of the bore 48. After this cup 58 is installed, it is sealed by the application of sealing compound 60. The inner race of the ball bearing 54 is mounted on a reduced diameter portion 62 of the shaft 43 and is held against a shoulder 64 by a washer 66 and a rivet-formed shoulder 68. It will be seen that, thus installed, the ball bearing 54 forms an axial positioner and thrust taker for the driven wheel 45.

The pickup, indicated generally by the numeral 70 and consisting of a coil 72, suitable wiring harness 74 (shown in FIG. 3), a permanent magnet 76 and a pole piece 78, is positioned in the box-shaped portion of the structural elements 38 with the pole piece 78 projecting at the open end into proximity with the teeth of the tone wheel 46, and is secured in place by application of potting compound. If a removable shim of suitable dimensions is placed between the pole piece 78 and the tone wheel 46 while the potting compound is hardening, a permanent fixed clearance will be established.

An important feature of the invention is illustrated in detail in FIGS. 8, 9 and 10 which show three views of the plastic molding 80. The molding 80 includes a coil-forming or bobbin section 82 which surrounds a rectangular central opening 84 designed to receive in close fitting engagement the pole piece 78, and a circular cylindrical recess 86, extending from one end in alignment with the opening 84, designed to receive and accurately position the permanent magnet 76. The magnet 76 is preferably made of a suitable high-energy magnetic alloy. As seen clearly in the sectional view of FIG. 5, the pole piece 78 is T-shaped with a head 88 which seats against the shoulder 90 which forms the transition from the rectangular opening 84 to the circular recess 86. Thus, when the parts have been assembled by application of the potting compound, the pole piece 78 is securely held against withdrawal from the bobbin 82. FIG. 5 also illustrates how the pole piece 78 is formed with two teeth 79 spaced equally with the teeth of the tone wheel 46. By this means the flux variation and, therefore, the signal strength is materially increased as the teeth 79 of the pole piece and those of the tone wheel 46 are alternately aligned and not aligned as the tone wheel 46 revolves. Two slots 92 extend through a central flange 94 into a pair of recesses 96 formed between the outer shell or boxlike portion of the structural elements 38 and the portion of the plastic molding 80 which contains the recess 86 for the magnet 76. A pair of coil terminal fittings 98 are crimped into the slots 92 and extend into the recesses 96 to be connected in compact manner with the coil leads of the wiring harness 74.

The wiring harness, as shown in FIGS. 1, 2 and 3, is provided with a molded elastomeric grommet 100 which passes through a suitable hole 102 in the brake backing plate 18. The hole 102 is made large enough to pass through the permanently attached terminal fittings 104 at the other end of the wiring harness. The terminal fittings 104 are, in turn, attached to wiring harness (not shown) leading to other components of the adaptive braking system.

To complete the wheel-speed sensor of the invention, a friction drive wheel 106 is provided in the form of a large cup-shaped element 108 (shown in FIGS. 11, 12 and 13). The cup 108 consists of a flat bottom portion 110 having a central opening 112 which fits closely over the pilot projection 28 of the axle 12. Generally, cylindrical parts 114 are of greater diameter than the axle flange 14 so that the cup 108 can be readily placed thereover with the inner margin of the cylindrical parts inside the vehicle brake. This inner margin is formed with a groove or channel 116 which opens inwardly, i.e., toward the centerline of the axle, and an elastomeric friction drive ring 118 of generally square cross section is seated in this groove. In order to adequately secure the friction ring 118 in the groove 116, one sidewall 120 is formed with a multiplicity of equally spaced lanced-in portions which forms fingers or projections 122 disposed in a manner to resist withdrawal of the ring 118. After the ring 118 is inserted into the groove 116, the other sidewall 124 of the groove is crimped inwardly about the entire circumference of the cup 108. This can be seen more clearly by reference to FIG. 14. Other ways of deforming the sidewalls 120 and 124 of the groove 116 to positively secure the ring 118 may be envisioned within the spirit of the invention.

In operation, the spring 36 supports and positions the driven wheel, tone wheel and pickup assembly 32 into tight but resilient contact with the inner surface of the friction ring 118 so that the tone wheel, driven wheel 45 is rotated at very high speed. As the tone wheel is rotated, its teeth are alternately aligned and not aligned with the teeth of the pole piece 78 causing a variation of magnetic flux therein and inducing an alternating voltage in the pickup coil 72 which is transmitted via the wiring harness 74 to the computer of the adaptive braking system.

We claim:

1. A wheel-speed sensor for use on a vehicle wheel having a rotatable portion and a nonrotatable portion, said sensor comprising:
    a friction drive wheel;
    a driven wheel rotatably driven by said drive wheel;
    a tone wheel rotatable with said driven wheel;
    pickup means in close proximity with said tone wheel for generating a signal representative of the rotational velocity of said vehicle wheel; and
    structural means for combining said driven wheel, tone wheel and pickup means into a unitary assembly and mounting said assembly on said nonrotatable portion of said vehicle wheel;
    said friction drive wheel including an inwardly opening groove formed on an inner margin, a friction ring secured in the groove by crimping the groove walls into said groove, a plurality of fingers formed in the inner wall of said groove for said crimping of said groove walls to hold the friction ring in place, and a cup-shaped portion for extending the friction ring over a flange portion of an axle of said vehicle wheel.

2. The wheel-speed sensor, as recited in claim 1, wherein said structural means are an integral stamping formed from a sheet of metallic material.

3. A wheel-speed sensor for use on a wheel of a vehicle, said sensor comprising:
    a friction drive wheel mounted for rotation with said vehicle wheel;
    a driven wheel rotatably driven by said drive wheel;
    a tone wheel rotatable with said driven wheel;
    a shaft rotatably supporting said driven wheel and said tone wheel;
    a rigid link carried by a nonrotative portion of the vehicle said shaft being mounted on said link;
    pickup means mounted on said rigid link a predetermined distance from said tone wheel; and
    resilient means yieldably urging said rigid link toward said drive wheel, said resilient means yieldably maintaining said driven wheel in engagement with said drive wheel.

4. The invention of claim 3:
    said resilient means being a generally C-shaped leaf spring presenting a pair of arms;
    one of said arms being secured to said nonrotative portion of the vehicle;
    the other arm being secured to said rigid link.

5. The invention of claim 3:
    said pickup means including a permanent magnet, a pole piece connected to said permanent magnet and in close proximity with said tone wheel, a coil operatively connected to said pole piece to determine magnetic flux variations therein, and a molded element for combining said permanent magnet, pole piece and coil into a compact, unitary structure.

6. The wheel-speed sensor, as recited in claim 5, wherein said pickup means further includes notches in the end of said pole piece, said notches being alternately aligned and not aligned with said tone wheel to produce maximum and minimum magnetic flux in said pole piece, respectively.

7. The wheel-speed sensor, as recited in claim 6, wherein said molded element of said pickup means includes:
    a coil-forming portion to permit easy forming of said coil in a close relationship with said pole piece;
    a center bore to receive said pole piece and means to prevent said pole piece from moving once positioned; and
    a cylindrical recess for receiving and positioning said permanent magnet.

* * * * *